United States Patent
Bastide et al.

(10) Patent No.: US 9,495,348 B2
(45) Date of Patent: Nov. 15, 2016

(54) TEMPLATE APPLICATION ERROR DETECTION

(75) Inventors: Paul R. Bastide, Boxford, MA (US); Matthew E. Broomhall, Burlington, VT (US); Robert E. Loredo, Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 12/967,913

(22) Filed: Dec. 14, 2010

(65) Prior Publication Data

US 2012/0151309 A1    Jun. 14, 2012

(51) Int. Cl.
| | |
|---|---|
| *G06F 17/00* | (2006.01) |
| *G06F 17/24* | (2006.01) |
| *G06F 17/27* | (2006.01) |
| *G06F 17/21* | (2006.01) |
| *G06Q 10/10* | (2012.01) |
| *G06F 17/30* | (2006.01) |
| *G06F 3/0481* | (2013.01) |

(52) U.S. Cl.
CPC .......... *G06F 17/248* (2013.01); *G06F 17/273* (2013.01); *G06F 3/0481* (2013.01); *G06F 17/211* (2013.01); *G06F 17/24* (2013.01); *G06F 17/30056* (2013.01); *G06Q 10/10* (2013.01)

(58) Field of Classification Search
CPC .......... G06F 17/211; G06F 17/30056; G06F 17/24; G06F 17/248; G06F 3/0481; G06Q 10/10
USPC ........................... 715/732, 235, 273
See application file for complete search history.

(56) References Cited

U.S. PATENT DOCUMENTS

| | | | |
|---|---|---|---|
| 2006/0277452 A1* | 12/2006 | Villaron et al. | 715/500 |
| 2007/0263007 A1* | 11/2007 | Robotham et al. | 345/581 |
| 2011/0112832 A1* | 5/2011 | Prorock et al. | 704/235 |

* cited by examiner

*Primary Examiner* — Quoc A Tran
(74) *Attorney, Agent, or Firm* — Steven M. Greenberg, Esq.; CRGO Law

(57) ABSTRACT

Embodiments of the present invention provide a method, system and computer program product for template application error detection when applying a new template to an existing presentation. In an embodiment of the invention, a template application error detection process is provided. The process includes selecting an existing presentation in a presentation authoring application executing in memory of a computer. The process further includes applying a template to the existing presentation to form a modified presentation. Text in a slide of the existing presentation can be compared to text in a slide of the modified presentation to detect discrepancies in the text of both slides. Finally, an indicia of a suspected error can be displayed in the slide of the modified presentation in response to detecting a discrepancy.

11 Claims, 1 Drawing Sheet

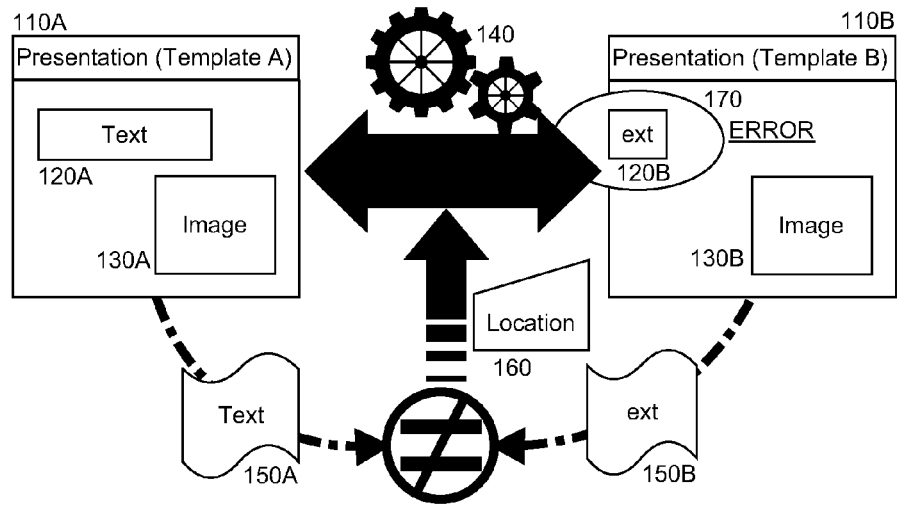
FIG. 1
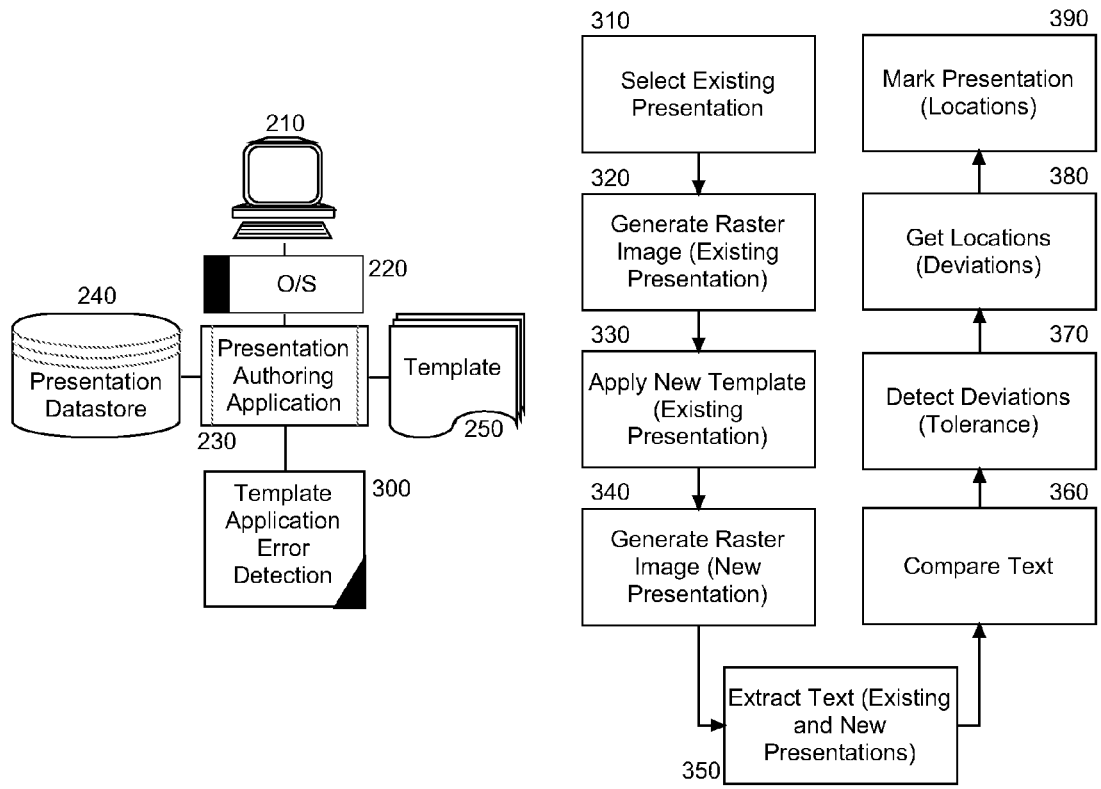
FIG. 2  FIG. 3

TEMPLATE APPLICATION ERROR DETECTION

BACKGROUND OF THE INVENTION

Field of the Invention

The present invention relates to presentation slide management and more particularly to template application to slide presentations in a computing system.

Description of the Related Art

Presentation software has formed the basis of corporate communications for well over a decade. Within the confines of the modern conference room, it has become nearly impossible to engage in oral discussion of a proposal without the use of a computer generated slide show. In this regard, the computerized presentation has become the mainstay of the oral presentation. Generally speaking, in a computerized presentation, a sequence of digital renderings of slides can be presented, either directly through a computer screen, or even through a projector or plasma presentation monitor. The individual slides, themselves, can include textual, audible and visual elements, including animated elements.

The prototypical presentation application includes a document processor, much like a word processor, in which the textual, visual and audible elements can be combined within a single slide show presentation. In this regard, each individual slide generally can follow a prescribed template, which can range from a free form workspace, to a highly structured arrangement of text, imagery and audio. In most cases, each slide will include a slide title and a slide body. While the slide title generally can include text only, the slide body can include free form text, bulleted or numbered lists, a picture, graph, chart, animation, audio and other such combinations.

While a presentation can be created based upon a prescribed template to include customized content such as text and background imagery, margins and border appearance, the template can vary at the direction of the presentation author while maintaining the content. In this regard, a tool can be provided in the presentation application to dynamically select and apply different templates to the same presentation in order to vary the visible appearance of the content. Exemplary changes resulting from a change in template can include different backgrounds, transitions between slides and fonts, to name only a few possibilities.

However, in doing so, oftentimes the appearance of the content can be altered in such a way as to defeat the presentability of the presentation. For instance, changing from one template to another, specific text in a presentation can suddenly become obscured through the inadvertent placement of a visual element over all or part of textual content in a presentation. As another example, a change in border size can result in unwanted text wrapping, or the off-screen movement of all or part of an image. At present, the presentation author must manually identify and correct formatting and content errors resulting from the application of a new template to an existing presentation.

BRIEF SUMMARY OF THE INVENTION

Embodiments of the present invention address deficiencies of the art in respect to presentation authoring and modification and provide a novel and non-obvious method, system and computer program product for template application error detection when applying a new template to an existing presentation. In an embodiment of the invention, a template application error detection process is provided. The process includes selecting an existing presentation in a presentation authoring application executing in memory of a computer, including an online presentation editor. The process further includes applying a template to the existing presentation to form a modified presentation. Text in a slide of the existing presentation can be compared to text in a slide of the modified presentation to detect discrepancies in the text of both slides. Finally, an indicia of a suspected error can be displayed in the slide of the modified presentation in response to detecting a discrepancy.

In another embodiment of the invention, a presentation authoring data processing system can be configured for automated template application error detection. The system can include a host computer with at least one processor and memory and a presentation authoring application executing in the memory of the host computer. The system yet further can include a template application error detection module executing in the memory of the host computer. The module can include program code enabled to compare text in a slide of an existing presentation in the presentation authoring application to text in a slide of a modified presentation formed in the presentation authoring application by applying a template to the existing presentation, to detect discrepancies in the text of both slides as a result of comparing the text of the slides, and to display an indicia of a suspected error in the slide of the modified presentation in response to detecting a discrepancy.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for template application error detection;

FIG. 2 is a schematic illustration of a presentation authoring data processing system configured for template application error detection; and, FIG. 3 is a flow chart illustrating a process for template application error detection in the presentation authoring data processing system of FIG. 2.

DETAILED DESCRIPTION OF THE INVENTION

Embodiments of the invention provide for template application error detection. In accordance with an embodiment of the invention, a presentation of one or more slides can be selected for modification in a presentation authoring application executing in the memory of a computer. The modification can include applying a new template to one or more of the slides of an existing presentation. Prior to applying the new template to the slides of the existing presentation, the pre-modification form of the existing presentation can be persisted for comparison to a post-modification form of the existing presentation. Once the template has been applied to the slides of the existing presentation, the text of the pre-modification form of the existing presentation can be compared to the text of the post-modification form of the existing presentation. Discrepancies in the text outside of a pre-determined tolerance can be flagged as errors resulting from the application of the new template to the existing presentation and the portion of the existing presentation affected by the flagged errors an be visually demarcated as such in order to call attention to the errors in the presentation authoring application.

In further illustration, FIG. 1 pictorially shows a process for template application error detection. As shown in FIG. 1, an existing presentation 110A including textual content 120A and imagery 130A can be modified into a modified presentation 110B including textual content 120B and imagery 130B through the application of a template to the existing presentation 110A. Once the template has been applied to the existing presentation 110A to produce the modified presentation 110B, template application error detection logic 140 can compare text 150A of the textual content 120A of the existing presentation 110A to text 150B of the textual content 120B of the modified presentation 110B. For discrepancies between the text 150A, 150B that fall outside an acceptable tolerance, the location 160 of the text 150B in the modified presentation can be noted and used to render a visual error notation 170 in the modified presentation 110B. In this way, the error resulting from the application of the template to the existing presentation 110A can be brought to the attention of the presentation author in the modified presentation 110B.

The process described in connection with FIG. 1 can be implemented in a presentation authoring data processing system. In yet further illustration, FIG. 2 schematically shows a presentation authoring data processing system configured for template application error detection. The system can include a host computer 210 with at least one processor and memory. The host computer 210 can support the execution of an operating system 220 that in turn can host the operation of a presentation authoring application 230. The presentation authoring application 230 can be configured to provide a canvas upon which different slides of a presentation can be authored to include text, imagery and even audio and audiovisual content. A presentation datastore 240 further can be provided in which different authored presentations can be stored for subsequent retrieval.

As part of the authoring process, the presentation authoring application 230 can be configured to support the use of templates 250 providing a base appearance for the slides of a presentation such as background coloring, patterns, fonts, borders and margins. The templates 250 further can provide for base functionality of the slides of a presentation, including modes of transition between slides and a period of time during which each slide is shown before transitioning to a next slide. Of note, a template application error detection module 300 can be coupled to the presentation authoring application 230.

The module 300 can include program code that when executed in the memory of the host computer 210, can compare text in an existing form of a presentation to text in a modified form of the presentation resulting from an application of a template to the existing form of the presentation. For discrepancies between the text of the existing and modified forms of the presentation that fall outside of a pre-determined level of tolerance, it can be presumed that an error has resulted from the application of the template to the existing form of the presentation. Consequently, the program code of the module 300 can be enabled to identify a display location of the text in a slide of the modified form of the presentation and to render a visual indication of the error proximate to the text demonstrating the discrepancy.

In even yet further illustration of the operation of the template error detection module 300, FIG. 3 is a flow chart illustrating a process for template application error detection in the presentation authoring data processing system of FIG. 2. Beginning in block 310, an existing presentation can be selected to receive application of a new template in order to create a modified form of the presentation. In block 320, the existing presentation can be exported to a rasterized form of a sequence of the slides of the presentation. Thereafter, in block 330, the template can be applied to the existing form of the presentation to produce a modified form of the existing presentation. In block 340, the modified form of the existing presentation can be exported to a rasterized form of a sequence of the slides of the presentation.

In block 350, for each slide of each rasterization, the text of each slide is extracted and in block 360, the extracted text is compared to identify discrepancies. A permissible degree of tolerance will have been defined for each slide such as the totality of all text in a given slide of the rasterization for the existing form of the presentation that matches within a certain percentage of characters all text of a corresponding slide of the rasterization for the modified form of the existing presentation. In block 370, discrepancies for each slide that exceed the predefined tolerance can be detected and in block 380, each slide with detected discrepancies can be identified. Optionally, each slide can be subdivided into smaller regions and the tolerance can be applied for the smaller region. Finally, in block 390, an error notation can be drawn at each physical location in which a discrepancy has been detected outside of the predefined tolerance in the modified form of the existing presentation so as to draw attention to suspected errors resulting from the application of the template to the existing form of the presentation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A template application error detection method comprising:
   selecting an existing presentation in a presentation authoring application executing in memory of a computer;
   applying a template to the existing presentation to form a modified presentation;
   comparing text in a slide of the existing presentation to text in a slide of the modified presentation to detect discrepancies in the text of both slides; and, displaying an indicia of a suspected error in the slide of the modified presentation in response to detecting a discrepancy.

2. The method of claim 1, wherein comparing text in a slide of the existing presentation to text in a slide of the modified presentation to detect discrepancies in the text of both slides, comprises:

exporting both the existing presentation to a rasterization of the existing presentation, and the modified presentation to a rasterization of the modified presentation; and, comparing text in a slide of the rasterization of the existing presentation to text in a slide of the rasterization of the modified presentation to detect discrepancies in the text of both slides.

3. The method of claim 1, wherein comparing text in a slide of the existing presentation to text in a slide of the modified presentation to detect discrepancies in the text of both slides, comprises:

establishing a tolerance of discrepancy when comparing text of a slide of an existing presentation to text of a slide of a modified presentation; and, comparing text in a slide of the existing presentation to text in a slide of the modified presentation to detect discrepancies in the text of both slides only when the text of the slide of the existing presentation differs from the text of the slide of the modified presentation beyond the established tolerance of discrepancy.

4. The method of claim 1, wherein comparing text in a slide of the existing presentation to text in a slide of the modified presentation to detect discrepancies in the text of both slides, comprises:

subdividing the slide of the existing presentation and a corresponding slide of the modified presentations into respective subregions; and, for each subregion, comparing text in the subregion of a slide of the existing presentation to text in a corresponding subregion of a slide of the modified presentation to detect discrepancies in the text of both subregions.

5. The method of claim 1, wherein displaying an indicia of a suspected error in the slide of the modified presentation in response to detecting a discrepancy, comprises displaying an indicia of a suspected error for particular text in the slide of the modified presentation at a location in the slide of the modified presentation proximate to the particular text in response to detecting a discrepancy.

6. A presentation authoring data processing system configured for automated template application error detection, the system comprising:

a host computer with at least one processor and memory;

a presentation authoring application executing in the memory of the host computer; and, a template application error detection module executing in the memory of the host computer, the module comprising program code enabled to compare text in a slide of an existing presentation in the presentation authoring application to text in a slide of a modified presentation formed in the presentation authoring application by applying a template to the existing presentation, to detect discrepancies in the text of both slides as a result of comparing the text of the slides, and to display an indicia of a suspected error in the slide of the modified presentation in response to detecting a discrepancy.

7. A computer program product for template application error detection, the computer program product comprising:

a non-transitory computer readable storage medium having computer readable program code embodied therewith, the computer readable program code comprising:

computer readable program code for selecting an existing presentation in a presentation authoring application executing in memory of a computer;

computer readable program code for applying a template to the existing presentation to form a modified presentation;

computer readable program code for comparing text in a slide of the existing presentation to text in a slide of the modified presentation to detect discrepancies in the text of both slides; and, computer readable program code for displaying an indicia of a suspected error in the slide of the modified presentation in response to detecting a discrepancy.

8. The computer program product of claim 7, wherein the non-transitory computer readable storage medium having computer readable program code embodied therewith, the computer readable program code comprising: the computer readable program code for comparing text in a slide of the existing presentation to text in a slide of the modified presentation to detect discrepancies in the text of both slides, comprises:

computer readable program code for exporting both the existing presentation to a rasterization of the existing presentation, and the modified presentation to a rasterization of the modified presentation; and, computer readable program code for comparing text in a slide of the rasterization of the existing presentation to text in a slide of the rasterization of the modified presentation to detect discrepancies in the text of both slides.

9. The computer program product of claim 8, wherein the non-transitory computer readable storage medium having computer readable program code embodied therewith, the computer readable program code comprising: the computer readable program code for comparing text in a slide of the existing presentation to text in a slide of the modified presentation to detect discrepancies in the text of both slides, comprises:

computer readable program code for establishing a tolerance of discrepancy when comparing text of a slide of an existing presentation to text of a slide of a modified presentation; and, computer readable program code for comparing text in a slide of the existing presentation to text in a slide of the modified presentation to detect discrepancies in the text of both slides only when the text of the slide of the existing presentation differs from the text of the slide of the modified presentation beyond the established tolerance of discrepancy.

10. The computer program product of claim 8, wherein the non-transitory computer readable storage medium having computer readable program code embodied therewith, the computer readable program code comprising: the computer readable program code for comparing text in a slide of the existing presentation to text in a slide of the modified presentation to detect discrepancies in the text of both slides, comprises:

computer readable program code for subdividing the slide of the existing presentation and a corresponding slide of the modified presentations into respective subregions; and, computer readable program code for each subregion, comparing text in the subregion of a slide of the existing presentation to text in a corresponding subregion of a slide of the modified presentation to detect discrepancies in the text of both subregions.

11. The computer program product of claim 8, wherein the non-transitory computer readable storage medium having computer readable program code embodied therewith, the computer readable program code comprising: the computer readable program code for displaying an indicia of a suspected error in the slide of the modified presentation in response to detecting a discrepancy, comprises computer readable program code for displaying an indicia of a suspected error for particular text in the slide of the modified presentation at a location in the slide of the modified presentation proximate to the particular text in response to detecting a discrepancy.

* * * * *